Sept. 18, 1962     D. N. YATES     3,054,204
ANIMATION ILLUSTRATOR

Filed Dec. 9, 1959     5 Sheets-Sheet 1

INVENTOR.
DONALD N. YATES
BY
*Philip J. McBean*
ATTORNEY

Sept. 18, 1962     D. N. YATES     3,054,204
ANIMATION ILLUSTRATOR
Filed Dec. 9, 1959     5 Sheets-Sheet 2
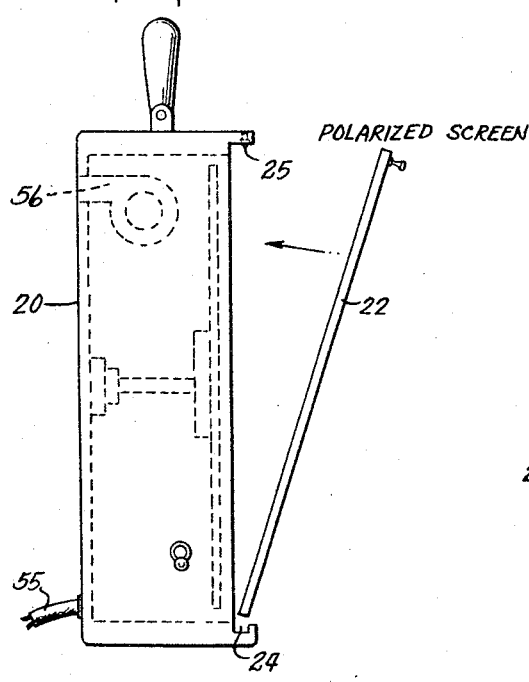
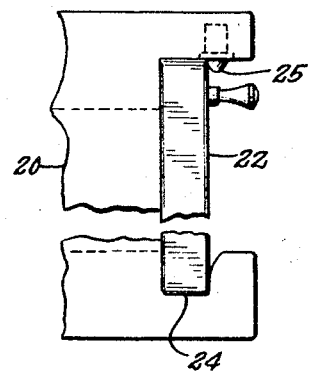
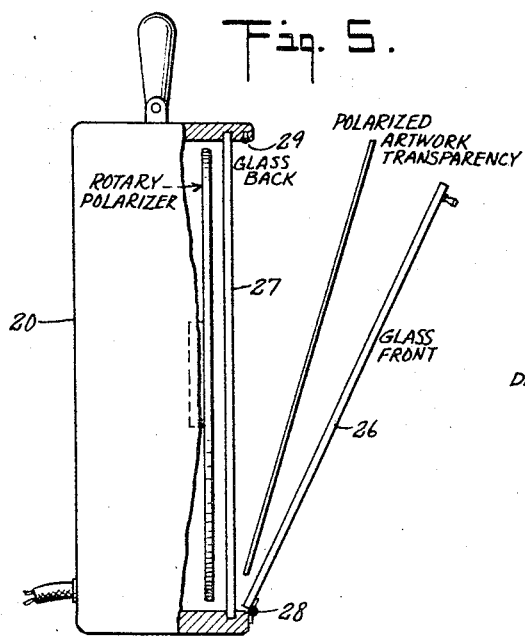
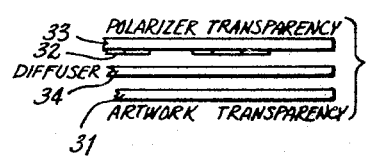
INVENTOR.
DONALD N. YATES
BY
ATTORNEY

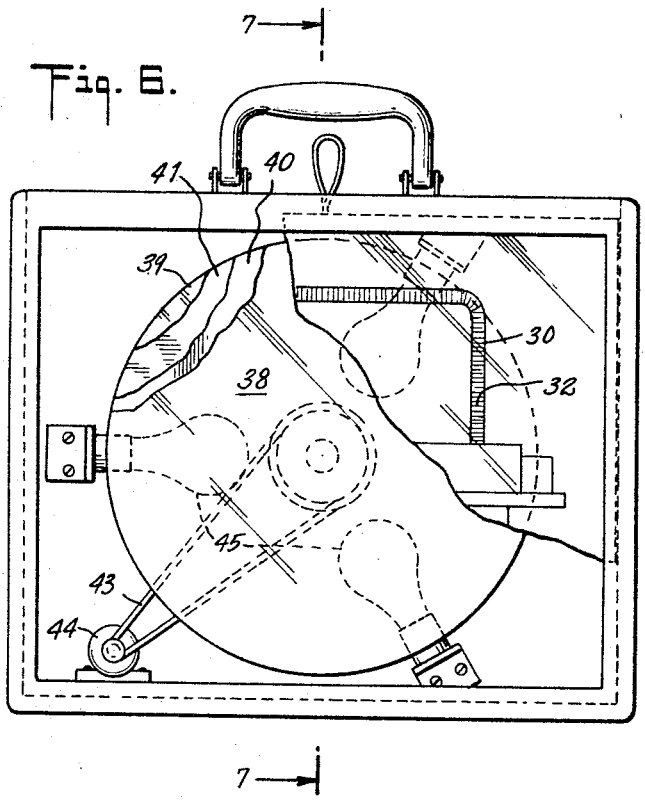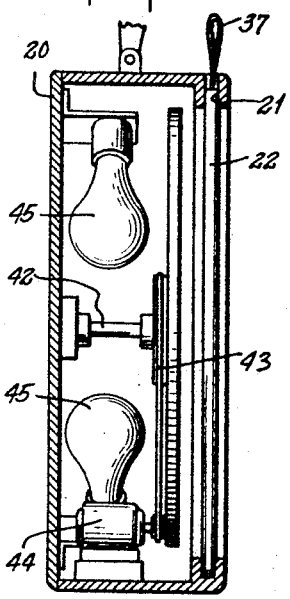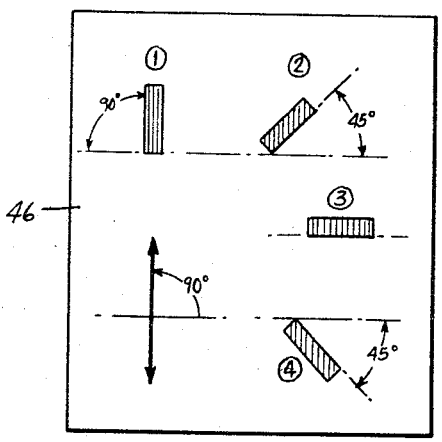

Sept. 18, 1962     D. N. YATES     3,054,204
ANIMATION ILLUSTRATOR
Filed Dec. 9, 1959     5 Sheets-Sheet 4
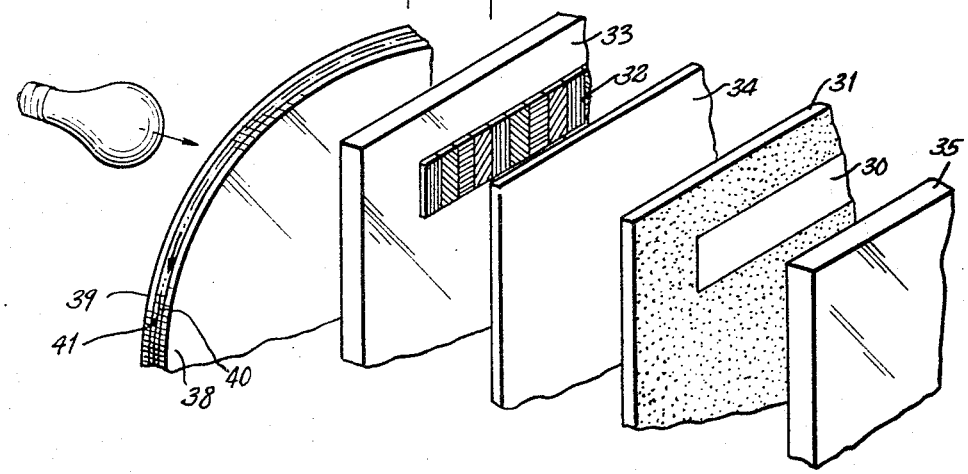
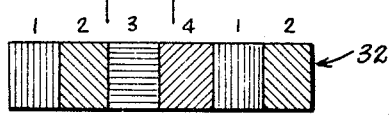
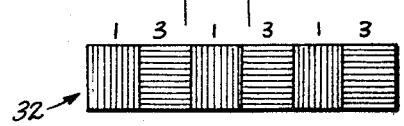
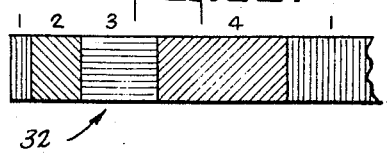
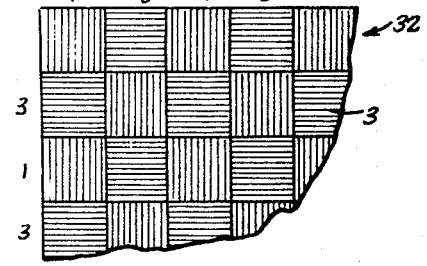
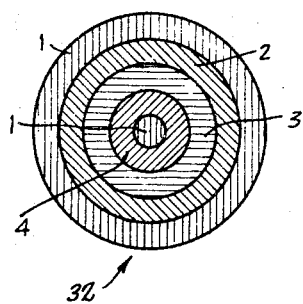
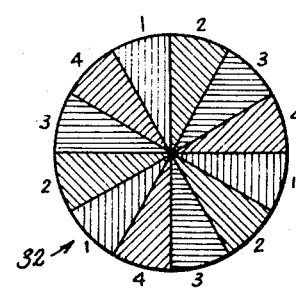
INVENTOR.
DONALD N. YATES
BY
ATTORNEY Sept. 18, 1962  D. N. YATES  3,054,204
ANIMATION ILLUSTRATOR
Filed Dec. 9, 1959  5 Sheets-Sheet 5
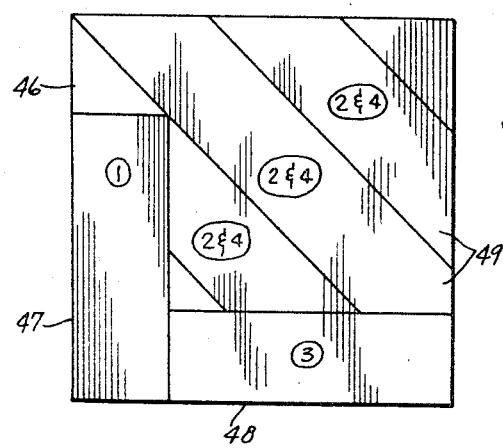
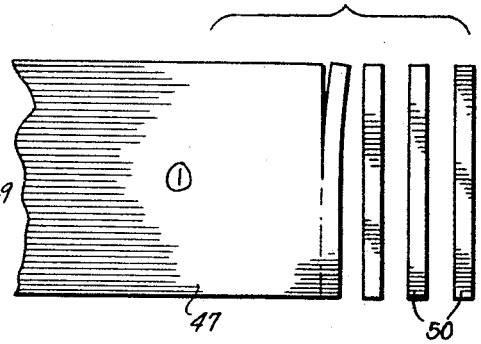
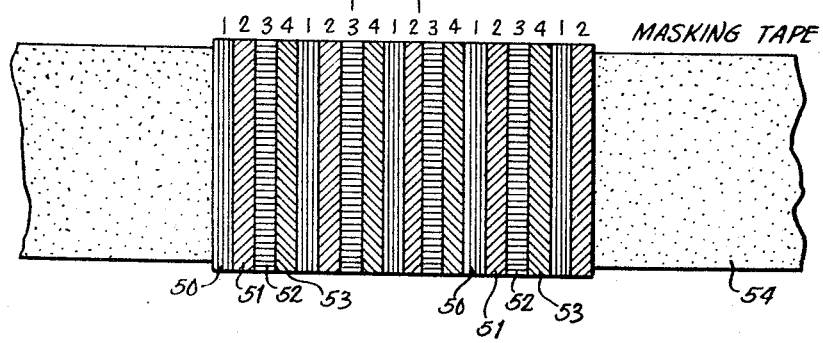
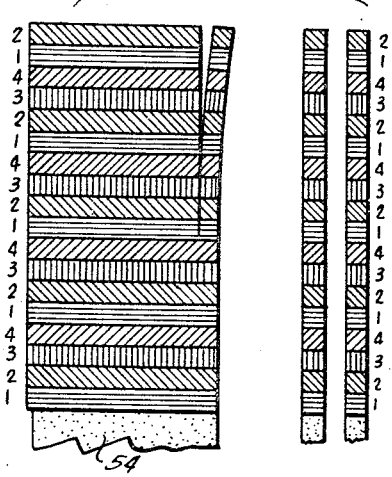
INVENTOR.
DONALD N. YATES
BY
ATTORNEY

3,054,204
ANIMATION ILLUSTRATOR
Donald N. Yates, Pittsburgh, Pa.
(710 Rockwood Drive, Gibsonia, Pa.)
Filed Dec. 9, 1959, Ser. No. 858,395
2 Claims. (Cl. 40—106.52)

The invention herein disclosed has been termed an animation illustrator because it depicts and illustrates motion.

The objects of the invention have been to provide a simple form of apparatus which will graphically portray and visualize the flow or movement of various objects or elements, for example, the flow of energy in a power plant, the flow of blood in the human system and the like.

More particularly it is a purpose of the invention to provide a device which will show movement in different directions and different in character, for example, in straight and curved lines, in rotation, in radially increasing and decreasing directions and in pulsating, accelerating and decelerating, checkerboard effects and the like.

A further special object of the invention is to show these effects vividly and sharply so as to attract and hold attention for such purposes as demonstrating and illustrating the operation of different systems and projects.

Other desirable objects accomplished by the invention are set forth and will appear in the course of the following specification.

The drawings accompanying and forming part of this specification illustrate the principles and practical applications of the invention but as will appear structure may be modified and changed as regards the immediate illustration, all within the true intent and scope of the invention as hereinafter defined and claimed.

FIG. 1 in the drawings is a perspective view of one practical embodiment of the invention, this being in the form of a portable cabinet in the nature of a suitcase and a viewing screen in the form of a transparency slide insertable in the front of the case.

FIG. 2 is a perspective view of the transparency slide withdrawn from the case, partly broken away and in section to show the transparent sheet carrying polarizing segments at the back, the diffuser sheet in front of that, the art work transparency carrying the design and the transparent front cover over that.

FIG. 3 is an end elevation illustrating a modification in which the screen is placed by dropping it into a groove and catching it at the top by a spring detent, at the front of the case.

FIG. 4 is an enlarged broken detail showing how the transparency is located and releasably held in this form of the invention.

FIG. 5 is an end elevation partly in section of another form of case having separable front and back transparent covers between which the removable transparency can be inserted.

FIG. 5a is a broken detail showing this form of removable transparency made up of just the three layers, a glass backing carrying the polarizing segments, a diffuser over that and the transparent sheet carrying the design over the latter.

FIG. 6 is a front elevation of the FIG. 1 form of the invention broken away to show the rotating disk in back of the screen and the disk broken to show it made up of front and back transparent plates holding between them a sheet of linear polarizing material and a layer of diffusing material.

FIG. 7 is a vertical sectional view of this unit on substantially the plane of line 7—7 of FIG. 6 showing particularly the motor driven rotary polarizer and lamps in back of the same.

FIG. 8 is a diagrammatic view showing how the different segments to be successively disposed may be cut in sets of four from one sheet of linear polarizing material.

FIG. 9 is a diagram showing how the 1, 2, 3, 4 segments of different angularity are arranged in that order in producing the effect of linear motion.

FIG. 10 is a diagrammatic view illustrating the general principle of the invention with light projected through a revolving polarizer and the sequentially arranged polarizing segments registered with the outlined design.

FIG. 11 is a diagrammatic view illustrating arrangement of the vertical, inclined, horizontal and reversely inclined four segments to produce simple linear flow effect.

FIG. 12 is a diagrammatic view illustrating alternate arrangement of vertical and horizontal lined segments to create pulsating effect.

FIG. 13 is a diagrammatic view showing a set of the four sequentially arranged segments of successively increased width to create an accelerating motion effect.

FIG. 14 is a diagrammatic view showing vertically and horizontally lined segments alternated to produce a checkerboard effect.

FIG. 15 is a diagram showing the four segments in circular form, concentrically disposed to produce a bullseye effect of radially expanding and contracting design.

FIG. 16 is a diagram showing the segments in sets of four arranged to produce a rotary spoke wheel effect.

FIG. 17 is a diagram showing how strips to provide the four successive segments may be cut from a rectangular sheet of linear polarizer.

FIG. 18 is a diagram of a wide strip taken from the main sheet and cut transversely into narrow strips for the final, number one segments.

FIG. 19 is a broken plan view diagrammatic in character showing how number 1, 2, 3 and 4 segment strips cut from corresponding supply strips, like that shown in FIG. 18, may be secured in that sequential order on a supporting strip or band of masking tape; and FIG. 20 is a diagrammatic view showing how the sequentially arranged segment strips may be cut into narrow cross strips of polarizing segments adapted to be directly applied to the outlined polarizing transparency.

Basically the invention involves the combination of a transparency carrying the design or figuration to be displayed or exhibited, outlined by polarizing units of sequentially ordered angularity and a linear polarizer rotatably related to said transparency.

Figure 1:
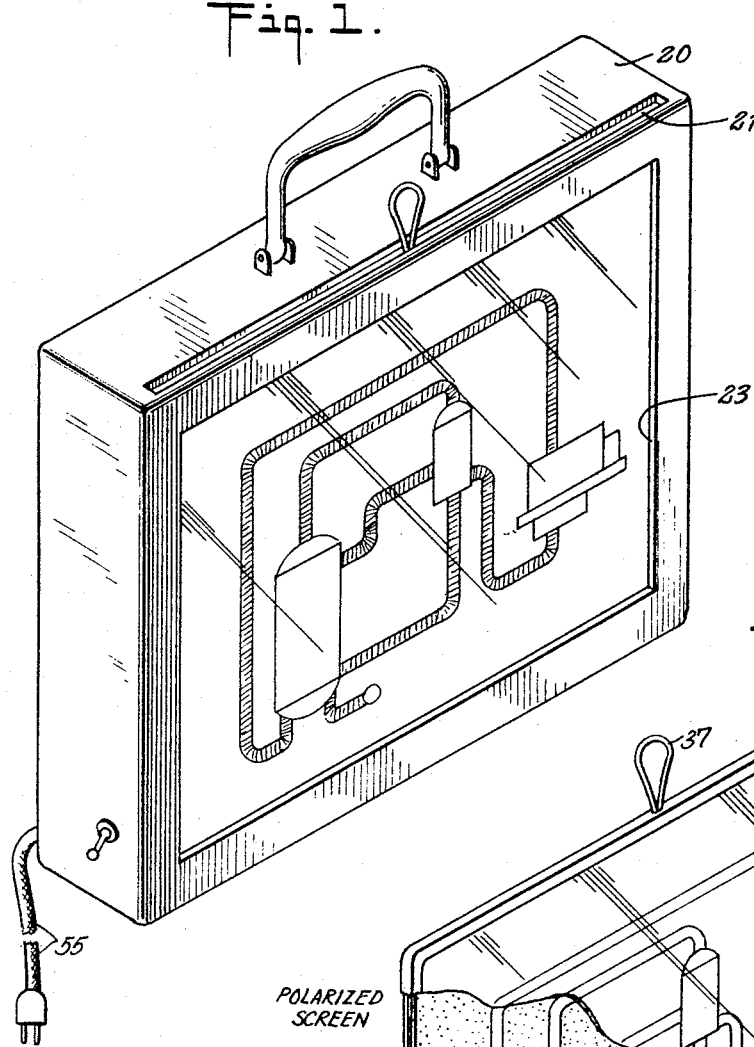

In the form of the invention shown in FIG. 1 the illustrative transparency is shown as a screen removably supported in a case containing the rotary polarizer and lighting means in back of the same.

Figure 2:
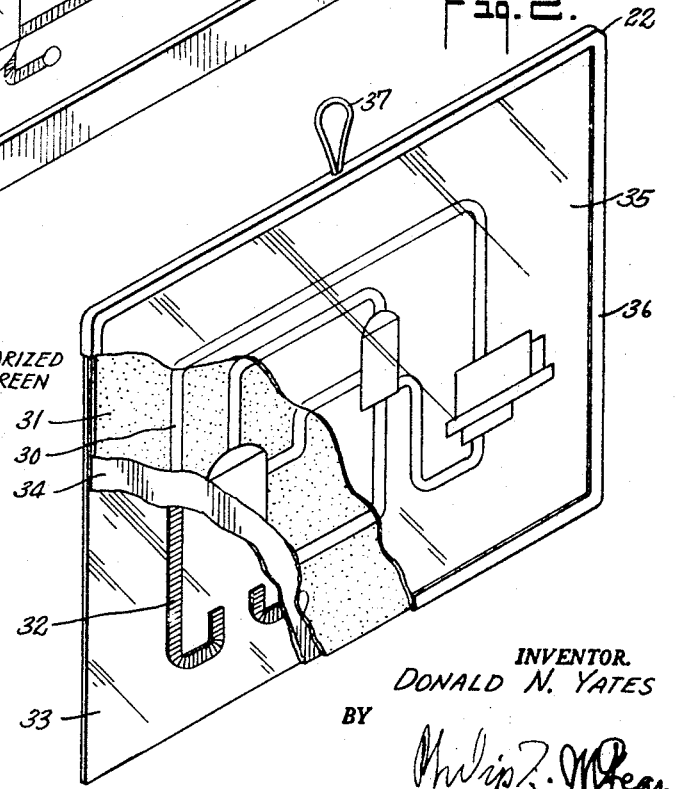

The carrier or container 20 is indicated as of suitcase dimensions so as to be readily portable and is shown as having a slot 21 in the top thereof through which the screen 22, FIG. 2, may be slidingly inserted and removed.

The front of the case is left open as indicated at 23 to expose the screen and if the unit is to be carried about or to be exposed to any extent this front portion of the case may be protected by a readily removable cover.

The removable character of the transparency enables the unit to be used for different purposes and it is contemplated that the screen or screens may be interchangeably mounted in different ways.

FIGS. 3 and 4 show how the transparency or screen 22 may be supported by engaging the lower edge of it in a groove 24 at the front of the casing and be caught at the top by a spring detent 25 positioned to snap over the upper edge of the screen.

FIGS. 5 and 5a show how the screen, in a modified form may be positioned between front and back covers 26, 27 of glass or other transparent medium. The back cover 27 may be stationary and the front cover 26 be hingedly supported at its lower edge at 28 and held at the upper edge by a detent 29.

The design or display transparency is made up of pictorial or illustrative matter 30 on a sheet 31, backed up or outlined by segments 32 of successively orientated polarizing material.

These polarizing segments are shown in FIG. 2 as carried by a transparent supporting plate or pane 33 in back of the design carrying layer 31 and separated therefrom by a light diffusing layer 34 of paper or the like.

The polarized artwork layer is shown protected by a front cover 35 of glass, plastic or the like and the several layers are shown bound together by a surrounding frame 36 to which is attached a lifting handle 37 for convenient removal and replacement of the slide in the guide channel.

Where the transparency is to be protected between front and back covers on the cabinet it may be of lighter and simpler construction, as shown in FIG. 5a, being then made up simply of the back transparency 33 carrying the polarizing segments 32, the diffuser layer 34 and the front transparency 31 carrying the design or artwork.

In back of the polarized design carrying screen there is mounted a rotary polarizer shown in FIGS. 6, 7 and 10 as made up of front and back circular transparent plates 38, 39, carrying between them a layer of linear polarizing material 40 and a diffusing layer 41.

This composite polarizer plate is shown carried by a rotatably mounted shaft 42 driven by belt 43 from electric motor 44.

Lamps 45 in back of the disk project light forwardly through the rotary polarizer and polarized outlined design.

To afford maximum contrast the design or illustrative matter 30 may be provided by outlining the same in transparent form on an opaque layer 31, with coloring or shading on the transparent portions as required to create the best distinctive effects.

The illusion or effect of motion is created by the combination of rotary linear polarizer with stationary sequentially angular polarizing segments outlining the display characters or picturization.

FIG. 8 shows how the succession of angularly related segments may be obtained from a single linearly polarized sheet of material such as "Polaroid."

The four segments used to complete a cycle are designated 1, 2, 3, 4 in this view, the first being of vertical alignment, the second inclined to the right, the third of horizontal alignment and the fourth inclined to the left, the reverse of the number 2 segment.

In practice segments 2 and 4 may be cut the same and the reverse inclination obtained by turning one of these segments over to the reverse side.

FIG. 9 shows how the sequentially inclined segments are combined in edge to edge relation in sets of four and these cycling sets repeated to carry on the desired flow of motion, for example as illustrating flow of steam through a pipe line as indicated in FIG. 6 where the segments appear at 32 through the transparent design 30.

To produce a simple linear flow the polarizing segments may be arranged in the repeated 1, 2, 3, 4 order shown in FIGS. 10 and 11.

A pulsating effect may be obtained by alternating the reversed polarizing segments 1 and 3, as shown in FIG. 12.

By successively increasing or decreasing the width of the segments the effects of accelerating and decelerating motion may be obtained as indicated in FIG. 13.

By alternating the segments in blocks as indicated in FIG. 14 various checkerboard effects may be obtained.

In FIG. 15, the successive segments are shown in circular form, concentrically arranged to create radiating expanding and contracting bullseye effects.

FIG. 16 shows how the successive segments may be cut in segments of a circle and combined in the 1, 2, 3, 4 order to create a rotary spoked wheel effect.

It will be apparent from this that the sets of sequentially angled polarizing segments may be cut in other shapes and sized and arranged in other ways to create various different motion effects.

FIGS. 17 to 20 illustrate a convenient and practical method of producing and assembling the polarizing segments in the desired successive or sequential relation.

FIG. 17 shows how the sheet 46 of linear polarized material may be cut in equal width sections, one in a wide vertical strip 47 for the number 1 segments, a horizontal wide strip 48 for the number 3 segments and diagonal wide strips 49 for the oppositely inclined 2 and 4 segments.

This method of cutting avoids waste of material and provides the successively inclined polarizers all from the one sheet of polarized material.

FIG. 18 shows how the number 1 wide strip 47 may be cut transversely into narrow relatively long cross strips 50, ready to be cut into the smaller final number 1 segments.

Each of the wide strips 47, 48 and 49 taken from the supply sheet is cut transversely into narrow, long cross strips as shown at 50, 51, 52 and 53 in FIG. 19 and arranged in this order in side by side relation on a suitable temporary supporting base such as the masking tape 54 shown in this view.

The strips of polarizing medium held in the successive order shown in FIG. 19 may then be cut down to any size or shape to fit the artwork of the transparency.

FIG. 20 shows how the co-related polarizing strips held in properly assembled relation on the masking tape can then be cut across, that is longitudinally of the tape as shown in FIG. 19 into the final size strips for application to the transparency, the supporting tape being stripped after adhering the segments to the supporting surface of the transparency, in FIGS. 2 and 10 the sheet 33 of glass, transparent plastic or the like.

While particularly practical to make up the unit in portable form as illustrated, it will be appreciated that this exhibiting device may be made up in various sizes and shapes to suit various purpose, such as incorporated in displays and exhibits.

The portable unit may be equipped with extension cord 55 for connection with any convenient electric outlet. Suitable provision for preventing overheating may be made such as a ventilating fan or blower as indicated at 56, FIG. 3.

The easy interchangeability of the viewing screens as shown in FIGS. 1, 3 and 5 is important as enabling one unit to be used for many display or exhibition purposes.

The screens may be made up to show various engineering and machine operations and for various illustrative, advertising and other informative purposes.

The screens may also be constructed of sizes as small as three inches by four inches; and without the diffuser, can be projected on a motion picture screen, using a small polarized disk rotating in front of the projector lens to attain motion.

The method of composing the sequences of consecutively angled polarizers is important as providing a simple practical way of cutting, assembling and attaching the polarizing segments to the transparencies.

While presently preferred embodiments of this invention, known as "Polavision" have been illustrated, it will be appreciated that the invention is not restricted to these particular forms but is of broader scope as defined in the claims.

What is claimed is:

1. Motion illustrating apparatus comprising the combination of a stationary transparent artwork viewing screen polarized in a running series of successively angularly orientated sections, a light source in back of said screen and a rotary linearly polarized member interposed between said light source and said successively angularly polarized screen, said successively orientated sections comprising polarized segments in groups of a given number and said groups being duplicates of each other and arranged in sequential order to create the appearance of an object moving continuously in one direction.

2. A polarized transparency for creating when combined with a rotating linear polarizer the effect of continuously flowing material comprising an artwork viewing screen carrying a transparent pictorial representation, polarizing segments grouped in 1, 2, 3, 4 order and comprising in that order vertically lined, inclined to one side, horizontally lined and inclined to the opposite side, polarizing segments, with said groups of four segments each arranged in successive order in position outlining the pictorial representation of said transparent artwork and whereby with projection of light through a rotating linear polarizer opposed to said screen, there will be created the effect of continuous motion along the lines outlined by said pictorial representation.

References Cited in the file of this patent

UNITED STATES PATENTS

| | | |
|---|---|---|
| 1,699,030 | Seelen | Jan. 15, 1929 |
| 2,122,225 | Wheelwright | June 28, 1938 |
| 2,169,022 | Chubb | Aug. 8, 1939 |
| 2,393,968 | Burchell | Feb. 5, 1946 |
| 2,535,781 | Burchell | Dec. 26, 1950 |
| 2,612,079 | Mahler | Sept. 30, 1952 |
| 2,674,159 | Binda | Apr. 6, 1954 |
| 2,846,799 | Viszlocky | Aug. 12, 1958 |
| 2,882,631 | Boone | Apr. 21, 1959 |
| 2,977,845 | Boone | Apr. 4, 1961 |
| 2,995,981 | Tamarin | Aug. 15, 1961 |